United States Patent  
Olsson

[15] 3,680,450  
[45] Aug. 1, 1972

[54] CEMENT CONCRETE STRUCTURE WITH ANCHORING MEANS FOR PREVENTING THE OCCURENCE OF LARGE CONTRACTION CRACKS AND A METHOD FOR FORMING CEMENT CONCRETE STRUCTURE

[72] Inventor: Gunnar Olsson, 16, Vibblabyvagen, Jakobsberg, Sweden

[22] Filed: July 2, 1970

[21] Appl. No.: 51,794

[30] Foreign Application Priority Data

July 4, 1969 Sweden..........................9509/69

[52] U.S. Cl. ..............................94/22, 94/10, 94/45
[51] Int. Cl. ..............................................E01c 21/00
[58] Field of Search..............94/3, 4, 9, 10, 22, 24, 8

[56] References Cited

UNITED STATES PATENTS

| | | | |
|---|---|---|---|
| 324,166 | 8/1885 | Riordan | 94/45 R |
| 993,086 | 5/1911 | Malloy | 94/45 R |
| 1,492,255 | 4/1924 | McCaffrey | 94/24 |
| 1,029,575 | 6/1912 | Blome | 94/10 |
| 2,910,921 | 11/1959 | Freyssinet | 94/8 |
| 1,453,261 | 5/1925 | Amies | 94/10 |
| 1,707,089 | 3/1929 | MacKenzie | 94/45 |
| 744,878 | 11/1903 | Sayre | 94/10 |
| 1,718,863 | 6/1929 | MacKenzie | 94/22 |

FOREIGN PATENTS OR APPLICATIONS 139,575   3/1920   Great Britain....................94/10

Primary Examiner—Jacob L. Nackenoff  
Attorney—Sughrue, Rothwell, Mion, Zinn & Macpeak

[57] ABSTRACT

A slab-shaped cement concrete body resting under friction on a base, primarily the base course of a road or runway, is formed with anchoring means firmly connected with the body and projecting into the base to produce a great plurality of fine fissure closely adjacent one another instead of fewer and larger contraction cracks due to shrinkage stresses in the body when the cement concrete hardens. The anchoring means projecting into the base can be produced in several ways in connection with the moulding of the cement concrete body so as to become firmly connected with said body.

2 Claims, 2 Drawing Figures

A CEMENT CONCRETE STRUCTURE WITH ANCHORING MEANS FOR PREVENTING THE OCCURENCE OF LARGE CONTRACTION CRACKS AND A METHOD FOR FORMING CEMENT CONCRETE STRUCTURE

This invention relates to a slab-shaped cement concrete body under friction resting on a base, such as the base of a road, and with cracks appearing therein due to shrinkage stresses in the body during hardening of the cement concrete and also to a method of forming a cement concrete structure, comprising such a cement concrete body.

BACKGROUND OF THE INVENTION

When cement sets a process is started, during which a cement binder or mortar, consisting of water and cement, binds together the mineral granules surrounded by the mortar. In this chemical process water is consumed, whereby the volume of the mortar is reduced, which in turn results in the mass containing the mortar as a constituent also having its volume reduced, which means that the mass shrinks.

Structures built on said mass are often formed in relatively thin layers in relation to their extension perpendicular to the thickness. Thus, for example, runway surface structures are formed with a vertical thickness of 5–25 cm, whereas the length of each cement concrete body or monolithe in the horizontal direction mostly is several tens of meters. Such a cement concrete body rests normally on a base or bed of another material. When the cement concrete body shrinks, tensile stresses directed parallelly to the surface of the base are produced in the hardening mass. Since the cement concrete body rests on a base, a pressure is produced therein, so called base or bed pressure. The magnitude of the tensile stresses is in proportional relationship to the frictional forces produced between the cement concrete structure and the base. In other words forces are created in the cement concrete body, which are directed towards the central point of the structure or a central zone located around said point, and friction forces are produced in the base or bed, which are active in the opposite direction.

The increase of the stresses in the cement concrete structure, i.e., the tractive forces or traction which come to extension in this structure to overcome the frictional forces, is assumed to be continuous from the moment the cement begins to set until the setting ceases, when said increase has its maximum value. Some fluctuations in the continuity may occur due to external changes in temperature and external loads, but on the whole the course of increase of tension is continuously.

When the accumulated frictional forces exceed the tensile strength in a section of the cement concrete body a fracture is caused, which fracture appears in the shape of a so called contraction crack. When the cement concrete body has a large dimension in horizontal direction numerous such cracks are produced.

The number of cracks per length unity is also dependent on the magnitude of the frictional forces.

When building roads or runway surface structures with cement concrete bodies resting on the base course, and possibly with a wear layer or surface dressing of a bituminous mass, these contraction cracks cause great inconvenience partly due to the so called reflex cracks, which are produced in the bituminous wear layer and partly due to the disturbing noise caused when vehicles pass the cracks.

THE PRIOR ART

It is tried to avoid these troubles by making the bituminous layer very thick and thereby to prevent the cracks in the cement concrete body from completely penetrating through the asphalt layer. Such a construction of a road, however, is very expensive.

OBJECTS OF THE INVENTION

One main object of the invention is thus to provide such a cement concrete body on a base or bed that shrinking stresses appearing therein produce a very great number of fine fissures in the cement concrete body, which cannot reproduce themselves in a thin asphalt wear layer possibly applied upon as dressing surface. Irrespective whether or not a wear layer of asphalt is used, the very fine fissures located closely adjacent one another will not have any unfavorable effect on the road or runway surface in itself, contrary to cracks appearing in known constructions.

SUMMARY OF THE INVENTION

A slab cement concrete body according to the invention is characterized in that it is anchored in the base and by means of anchoring means projecting into the base firmly connected with the cement concrete body for the purpose of producing contraction fissures, located closely adjacent one another. These anchoring means thus are to cause a maximum friction between the base or bed, for example consisting of gravel or macadam, and the cement body, and thereby to bring about in each individual small section of the cement concrete body such an accumulation of frictional forces that a very fine contraction fissure appears in this small section.

To release the contraction or shrinkage stresses in the concrete body the smallest force is needed, i.e., the frictional force in the first stage of setting of the cement concrete.

Practical tests with cement concrete bodies according to the invention have shown that the contraction fissures become so fine that they are almost invisible for the naked eye, and so many that there is no risk of penetration up through a very thin wear layer of asphalt of the order of magnitude of 1.5 cm.

The invention also relates to a method of forming a cement concrete structure which includes a slab-formed cement concrete body resting under friction on a base or bed, which method is characterized in that the lower surface of the cement concrete body facing the base is anchored in said base by means of stiff anchoring elements projecting into the base and firmly connected with the cement concrete body.

DRAWINGS

Further objects and advantages of the invention will become apparent from the following description considered in connection with the accompanying drawing, which forms part of this specification and of which FIG. 1 is a sectional view of a cement concrete structure and FIG. 2 is a sectional view following the line II—II of FIG. 1.

DETAILED DESCRIPTION

Figure 1:
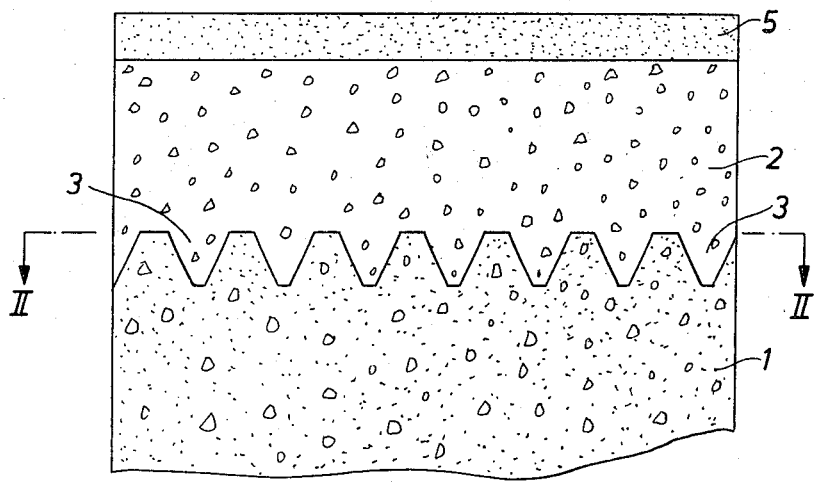

Referring now to the drawing and in particular FIG. 1, reference numeral 1 denotes a base, for example a bed of gravel or macadam, and reference numeral 2 a cement concrete body, which here is assumed to be covered by an upper wear layer or surface dressing 5 of asphalt. According to the invention, the concrete body 2 is anchored in the bed 1 by means of anchoring means 3. The anchoring means 3, which constitute an integral part of the concrete body 2, are formed for example by moulding a cement concrete layer on base 1, and then tap-like members which may be, for example, half-spherical or pyramidal members are pressed down through the cement concrete layer by means of a roller or similar means for compaction of the cement concrete layer, which roller on its surface has protruding taps, which penetrate through the cement concrete layer and down into the base, the taps forcing down concrete into the impressions 4 produced in the base, which depressions partially also are filled with concrete running down from the cement concrete layer.

Figure 2:
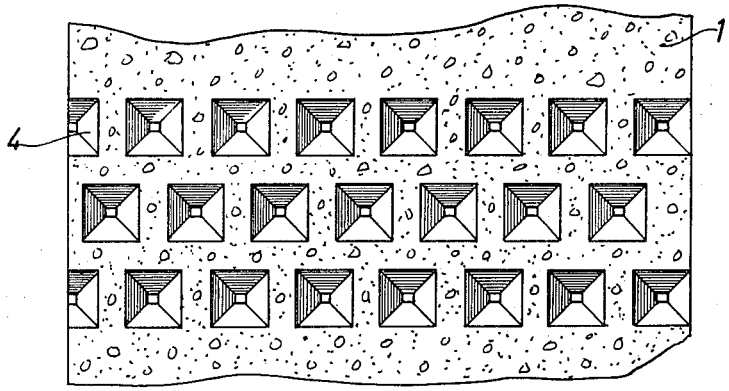

Another method of providing the anchoring elements 3 is prior to the moulding of the cement concrete body 2 on the base to make impressions 4 (see FIG. 2) in base 1 by means of a so called sheeps-footroller, i.e. a roller, which on a cylindrical surface is provided with protruding taps, whereafter cement concrete is moulded on the base and the anchoring means 3 are produced simultaneously and integral with the cement concrete body.

It is also possible to attain the required friction between the cement concrete body and the base by forcing down, e.g., sharp edged prismatic or spherical, rigid anchoring elements into the base in such a manner that upper portions of said elements remain projecting upwards from the upper surface of the base to be encased in the cement concrete when this is applied onto the base.

By this anchoring of the concrete body in the base by means of anchoring members 3 which are firmly connected with the concrete body and which may have their centers spaced by about 14 cm, for example, the friction force between the cement concrete body and the base can be regarded as infinite. This results in a release of the appearing contraction stresses by formation of a very great number of fine fissures with little mutual spacing. As a consequence thereof the movements in the individual cement concrete bodies or monolithes between the fissures due to changes in temperature become very small and more precisely so small that they do not penetrate through thin layer 5 of asphalt covering the cement concrete body as surface dressing.

The invention thus permits construction of roads or runway surfaces, in which such a distribution of unavoidable contraction fissures is obtained that they have no unfavorable effects on the runway. Moreover, the invention has the result that both an asphalt wear layer if applied, and a cement concrete wear layer can be made considerably thinner than in known constructions, and thereby the costs are essentially lowered.

It is possible also to subdivide the concrete body in a manner known per se into two cement concrete layers separated from one another, which are moulded at various occasions and the surfaces of which facing one another are made rugged or grooved in order to obtain good adherence. The anchoring means described herein before can also be modified and, for example, consist of crests running in the longitudinal direction of the concrete body and crossed by transversally extending crests.

While one more or less specific embodiment of the invention has been shown and described, it is to be understood that this is for purpose of illustration only, and that the invention is not to be limited thereby, but its scope is to be determined by the appended claims.

What is claimed is:

1. A method for bonding a layer of cement concrete to a deformable base layer to form fine contraction fissures closely adjacent to one another in the cement concrete comprising,
   applying cement concrete over said base layer and then forcing portions of the lower surface of the cement concrete into said base layer by subjecting said cement concrete to a pressure member having a series of regular spaced, deformation producing projections whereby a plurality of closely spaced projections extending from the lower surface of the cement concrete is caused to be embedded into said base layer to cause a great plurality of fine contraction fissures to be formed in said cement concrete.

2. The method of claim 1 wherein said step of subjecting said cement concrete to a pressure member includes subjecting the cement concrete to a pressure member having generally pyramid shaped projections.

* * * * *